(12) United States Patent
Schaeffer et al.

(10) Patent No.: US 10,668,572 B2
(45) Date of Patent: Jun. 2, 2020

(54) WELDING ELECTRODE WIRES HAVING ALKALINE EARTH METALS

(71) Applicant: Lincoln Global, Inc., Santa Fe Springs, CA (US)

(72) Inventors: Ben Schaeffer, Rocky River, OH (US); Steven Peters, Huntsburg, OH (US); Badri Narayanan, Mayfield Heights, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 505 days.

(21) Appl. No.: 15/353,520

(22) Filed: Nov. 16, 2016

(65) Prior Publication Data

US 2018/0133844 A1    May 17, 2018

(51) Int. Cl.
*B23K 35/02*       (2006.01)
*B23K 9/173*       (2006.01)
(Continued)

(52) U.S. Cl.
CPC .......... *B23K 35/0261* (2013.01); *B23K 9/173* (2013.01); *B23K 35/0266* (2013.01); *B23K 35/286* (2013.01); *B23K 35/3053* (2013.01); *B23K 35/3605* (2013.01); *B23K 35/3613* (2013.01); *C22C 21/02* (2013.01);
(Continued)

(58) Field of Classification Search
CPC ................ B23K 35/0261; B23K 9/173; B23K 35/3613; B23K 35/3605; B23K 35/286; B23K 35/3053; B23K 35/0266; C22C 21/18; C22C 21/16; C22C 21/14; C22C 21/10; C22C 21/08; C22C 21/02; C22C 38/58; C22C 38/50; C22C 38/46; C22C 38/44; C22C 38/42; C22C 38/34;
(Continued)

(56) References Cited

U.S. PATENT DOCUMENTS 3,243,285 A    3/1966  Fragetta et al.
3,573,426 A    4/1971  Blake et al.
(Continued)

FOREIGN PATENT DOCUMENTS

CN    102343488    2/2012
CN    102430877    5/2012
(Continued)

OTHER PUBLICATIONS

Bajic, Nikola, et al. "The Advantages of Using Activated Flux-Cored Wire Compared to Solid Wire in the Mag Welding Process from the Aspect of Metallurgical Characteristics" *Metalurgija* 53.3 (2014): pp. 361-364.
(Continued)

*Primary Examiner* — Dana Ross
*Assistant Examiner* — Kuangyue Chen

(57) ABSTRACT

The disclosed technology generally relates to welding, and more particularly to a consumable electrode wire for metal arc welding, and a method and a system for metal arc welding using the consumable electrode wire. In one aspect, a consumable welding wire configured to serve as an electrode during metal arc welding comprises one or more alkaline earth metal elements at a concentration between 0.005% and 10% on the basis of a total weight of the welding wire.

8 Claims, 7 Drawing Sheets

(51) Int. Cl.

| | | |
|---|---|---|
| *C22C 21/18* | (2006.01) | |
| *C22C 21/16* | (2006.01) | |
| *C22C 21/14* | (2006.01) | |
| *C22C 21/10* | (2006.01) | |
| *C22C 21/08* | (2006.01) | |
| *C22C 21/02* | (2006.01) | |
| *C22C 38/58* | (2006.01) | |
| *C22C 38/50* | (2006.01) | |
| *C22C 38/46* | (2006.01) | |
| *C22C 38/44* | (2006.01) | |
| *C22C 38/42* | (2006.01) | |
| *C22C 38/34* | (2006.01) | |
| *C22C 38/16* | (2006.01) | |
| *C22C 38/14* | (2006.01) | |
| *C22C 38/06* | (2006.01) | |
| *C22C 38/04* | (2006.01) | |
| *C22C 38/02* | (2006.01) | |
| *C22C 38/00* | (2006.01) | |
| *B23K 35/36* | (2006.01) | |
| *B23K 35/30* | (2006.01) | |
| *B23K 35/28* | (2006.01) | |

(52) U.S. Cl.
CPC .............. *C22C 21/08* (2013.01); *C22C 21/10* (2013.01); *C22C 21/14* (2013.01); *C22C 21/16* (2013.01); *C22C 21/18* (2013.01); *C22C 38/002* (2013.01); *C22C 38/02* (2013.01); *C22C 38/04* (2013.01); *C22C 38/06* (2013.01); *C22C 38/14* (2013.01); *C22C 38/16* (2013.01); *C22C 38/34* (2013.01); *C22C 38/42* (2013.01); *C22C 38/44* (2013.01); *C22C 38/46* (2013.01); *C22C 38/50* (2013.01); *C22C 38/58* (2013.01)

(58) Field of Classification Search
CPC ......... C22C 38/16; C22C 38/14; C22C 38/06; C22C 38/04; C22C 38/02; C22C 38/002
USPC .......................................................... 219/74
See application file for complete search history.

(56) References Cited

U.S. PATENT DOCUMENTS

| | | | |
|---|---|---|---|
| 3,702,390 A | 11/1972 | Blake et al. | |
| 4,016,399 A | 4/1977 | De Haeck | |
| 4,551,610 A | 11/1985 | Amata | |
| 5,118,919 A * | 6/1992 | Chai ................... | B23K 35/3073 219/137 WM |
| 6,835,913 B2 | 12/2004 | Duncan et al. | |
| 6,933,468 B2 * | 8/2005 | Keegan .............. | B23K 35/0266 219/145.22 |
| 7,763,822 B2 | 7/2010 | Nicklas | |
| 7,829,820 B2 | 11/2010 | Karogal et al. | |
| 2003/0098296 A1* | 5/2003 | Keegan .............. | B23K 35/0266 219/145.22 |
| 2006/0144836 A1* | 7/2006 | Karogal .............. | B23K 35/3605 219/146.1 |
| 2006/0219685 A1 | 10/2006 | Karogal et al. | |
| 2014/0061175 A1* | 3/2014 | Barhorst ............ | B23K 35/0266 219/137 WM |
| 2014/0263194 A1* | 9/2014 | Narayanan .............. | B23K 35/22 219/76.1 |
| 2014/0263259 A1* | 9/2014 | Narayanan ......... | B23K 35/3053 219/145.22 |
| 2015/0099140 A1* | 4/2015 | Amata ................... | B23K 35/30 428/659 |
| 2016/0243656 A1* | 8/2016 | Berube .............. | B23K 35/0266 |
| 2017/0043434 A1 | 2/2017 | Barhorst et al. | |
| 2018/0079024 A1 | 3/2018 | Hsu | |

FOREIGN PATENT DOCUMENTS

| | | |
|---|---|---|
| CN | 102489902 | 6/2012 |
| CN | 102554519 | 7/2012 |
| CN | 103056549 | 4/2013 |
| CN | 104209662 | 12/2014 |
| CN | 104827201 | 8/2015 |
| WO | WO 2009/150340 | 12/2009 |
| WO | WO 2014/009800 | 1/2014 |

OTHER PUBLICATIONS

Bajic, Nikola, et al. "Welded Joints Testing Obtained by Application of Full and Activated Electrode" *Journal of Materials Science and Engineering* 5th ser. A.3 (2013): pp. 334-337. David Publishing, May 13, 2013.

Bang, et al. "Comparison of the Effects of Fluorides in Rutile-Type Flux Cored Wire", *Met. Mater. Int.*, vol. 16, No. 3, 2010, pp. 489-494.

"Classification and Designation of Carbon and Low-Alloy Steels", *ASM Handbook*, vol. 1, 10th Edition, pp. 147-149.

Matusiak, Jolanta, et al. "Emission of Dust and Gases in Tubular Cored Wire Welding of Steel" *International Journal of Occupational Safety and Ergonomics* 9.3 (2003): pp. 333-350.

"Specification for Carbon and Low-alloy Steel Flux Cored Electrodes for Flux Cored Arc Welding and Metal Cored Electrodes for Gas Metal Arc Welding", *American Welding Society*, Miami, FL: 2012, 2 pages.

"Standard Welding Terms and Definitions", *American Welding Society*, vol. 3. Miami 2010; 3 pages.

Wegrzyn, J., "Toxicity, Porosity and Impact Strength; Problems in Welding with Self-Shielding Cored Wires", *Welding International*, vol. 7, No. 9, 1993, pp. 677-682.

European Patent Office Search Report dated Jan. 12, 2018 for European Patent Application No. E 117 0265 EP; 12 pages.

Extended European Search Report from Corresponding Application No. 19174930.8; dated Oct. 16, 2019; pp. 1-7.

\* cited by examiner

WELDING ELECTRODE WIRES HAVING ALKALINE EARTH METALS

BACKGROUND

Technological Field

The disclosed technology generally relates to welding, and more particularly to consumable electrode wires for metal arc welding.

Description of the Related Art

In metal arc welding technologies, an electric arc is created between a consumable weld electrode wire, which serves as one electrode that advances towards a workpiece, which serves as another electrode. The arc melts a tip of the metal wire, thereby producing droplets of the molten metal wire that deposit onto the workpiece forms a weld bead.

As the complexity of welding requirements continues to grow, various technological approaches to address the increasingly complex requirements are being proposed. For example, competing demands include achieving high deposition rates for productivity, while simultaneously achieving a high quality weld bead in appearance and in mechanical properties, such as high yield strength, ductility and fracture toughness.

In particular, heavy fab users often desire very high deposition rates, e.g. deposition rates of ~30 lbs/hr or higher for open-arc welding. Some welding technologies aim to address this and other requirements by improving the consumables, e.g. by improving the physical designs and compositions of the electrode wires. However, in prior art electrodes, deposition at such high deposition rate often result in instability of the plasma arc, which in turn results in unacceptable quality of the weld bead. Thus, there is a need for consumable weld electrode wires capable of being used at high deposition rates while producing high quality weld.

SUMMARY

In one aspect, a consumable welding wire, e.g., a metal-cored consumable welding wire, configured to serve as an electrode during welding includes a sheath having a first base metal composition. The welding wire additionally includes a core surrounded by the sheath and comprising particles having a second base metal composition intermixed with one or more alkaline earth metal elements at a concentration between 0.005% and 10% on the basis of a total weight of the welding wire.

In another aspect, a method of metal arc welding comprises providing a consumable welding wire, e.g., a metal-cored consumable welding wire, configured to serve as an electrode, the welding wire comprising one or more alkaline earth metal elements at a concentration between 0.005% and 10% on the basis of a total weight of the metal-core wire, where the atoms of the one or more alkaline earth metal elements are alloyed with a base metal composition. The method additionally includes applying a current to generate a plasma arc sufficient to produce a steady stream of molten droplets formed of the material of the welding wire, thereby depositing the molten droplets onto a workpiece at a deposition rate exceeding 30 pounds per hour.

In yet another aspect, a system for metal arc welding includes a consumable welding wire, e.g., a metal-cored consumable welding wire, configured to serve as an electrode, where the welding wire comprises one or more alkaline earth metal elements at a concentration between 0.005% and 10% on the basis of a total weight of the welding wire, and where the atoms of the one or more alkaline earth metal elements are alloyed with a base metal composition. The system additionally includes a power source configured to apply a current to generate a plasma arc sufficient to produce a steady stream of molten droplets formed of the material of the welding wire. The system further includes a weld gun configured to deposit the molten droplets onto a workpiece at a deposition rate exceeding 30 pounds per hour.

DETAILED DESCRIPTION

Figure 1:
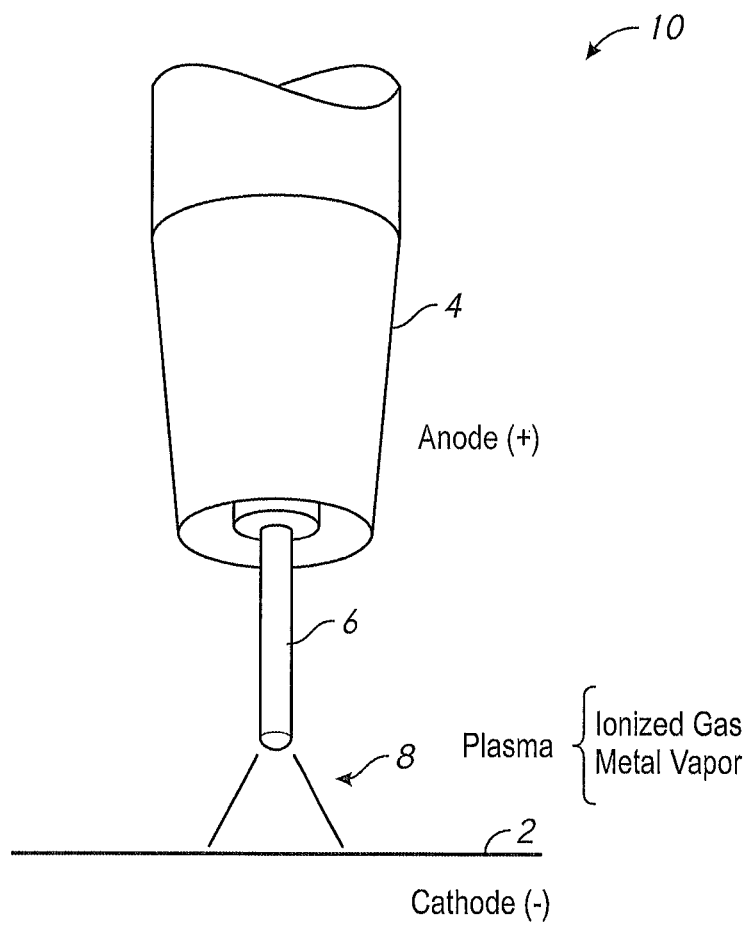
FIG. 1 is a schematic illustration of a configuration of electrodes in a metal arc welding process.

FIG. 1 is a schematic illustration of a configuration of electrodes in a metal arc welding process. In metal arc welding, e.g., gas-metal arc welding (GMAW), an electric arc is created between a consumable metal wire 6, which is electrically connected to one electrode 4 (e.g., anode (+)), and a workpiece 2, which serves as another electrode (e.g., cathode (−)). Thereafter, a plasma 8 is sustained, which contains neutral and ionized gas molecules, as well as neutral and charged clusters or droplets of the material of the metal wire 6 that have been vaporized by the arc. The consumable metal wire 6 advances towards the work piece 2, and the molten droplets of the metal wire 6 deposits onto the workpiece, thereby forming a weld bead.

Widely used arc welding processes include gas-metal arc welding processes, which can employ either solid electrode wires (GMAW) or metal-cored wires (GMAW-C), flux-cored arc welding processes (FCAW), which can be gas shielded flux-cored arc welding (FCAW-G) or self-shielded flux-cored arc welding (FCAW-S), shielded metal arc welding (SMAW) and submerged arc welding (SAW), among others.

As described herein, metal cored electrodes (GMAW-C) refer to electrodes having a core whose ingredients are primarily metallic. When present, nonmetallic components in the core have a combined concentration less than 5%, 3% or 1% on the basis of the total weight of each electrode. The GMAW-C electrodes are characterized by a spray arc and excellent bead capabilities.

In gas-metal arc welding using solid (GMAW) or metal-cored electrodes (GMAW-C), a shielding gas is used to provide protection for the weld pool and the weld bead against atmospheric contamination during welding. When solid electrodes are used, they are appropriately alloyed with active ingredients that, in combination with the shielding gas, are designed to provide porosity-free welds with the desired physical and mechanical properties of the resulting weld bead. When metal-cored electrodes are used, some of the active ingredients are added in the core of a metallic outer sheath, and designed to provide a similar function as in the case of solid electrodes.

Solid and metal-cored electrodes are designed to provide, under appropriate gas shielding, a solid, substantially porosity free weld with yield strength, tensile strength, ductility and impact strength to perform satisfactorily in the final applications. These electrodes are also designed to minimize the quantity of slag generated during welding. For some applications, metal-cored electrodes can be used as an alternative to solid wires to increase productivity. The metal-cored electrodes are composite electrodes having a core that is at least partially filled and surrounded by a metallic outer sheath. The core can include metal powder and active ingredients to help with arc stability, weld wetting and appearance and desired physical and mechanical properties. The metal-cored electrodes are manufactured by mixing the ingredients of the core material and depositing them inside a formed strip, and then closing and drawing the strip to the final diameter. For some applications, cored electrodes can provide increased deposition rates and a wider, more consistent weld penetration profile compared to solid electrodes. Moreover, for some applications, cored electrodes can provide improved arc action, generate less fume and spatter, and provide weld deposits with better wetting compared to solid electrodes.

In flux-cored arc welding (FCAW, FCAW-S, FCAW-G), cored electrodes are used. Cored electrodes used in flux-cored arc welding have a core that is at least partially filled and surrounded by a metallic outer sheath, similar to metal-cored electrodes described above. However, cored electrodes used in flux-cored arc welding additionally includes fluxing agents designed to provide protection for the weld pool and the weld bead against atmospheric contamination during welding, at least partially in lieu of a shielding gas. The cored electrodes used in flux-cored arc can additionally include other active ingredients to help with arc stability, weld wetting and appearance and desired physical and mechanical properties. A large number of compositions of the fluxing agent have been developed to control the arc stability, modify the weld metal composition, and to provide protection from atmospheric contamination. Arc stability is commonly controlled by modifying the composition of the flux. It is therefore often desirable to have substances which function well as plasma charge carriers in the flux mixture. In some applications, fluxes can also modify the weld metal composition by rendering impurities in the metal more easily fusible and providing substances with which these impurities may combine. Other materials are sometimes added to lower the slag melting point, to improve slag fluidity, and to serve as binders for the flux particles.

Various embodiments disclosed herein aim to address the increasingly complex requirements of high deposition rate in various welding processes described above. Advantageously, embodiments disclosed herein relate to electrodes comprising relatively large amounts of alkaline earth metal elements. In some embodiments, the electrodes are solid electrodes containing the relatively large amounts of alkaline earth metal elements. In some other embodiments, the electrodes are cored electrodes, e.g., metal-cored electrodes or flux-cored electrodes, for providing a broad range of metallurgical and physical characteristics that may be difficult or impossible to achieve with traditional stick welding. As described herein, high deposition rate refer to a deposition rate exceeding about 30 lbs/hr, which is much higher than rates practically achievable with most open arc welding processes. Embodiments of electrodes disclosed herein allow for such high deposition rates without developing excessive electrical resistance heating, even with relatively small diameter electrodes. In addition, resulting weld beads have desirable mechanical properties, such as yield strengths exceeding 80,000 psi.

Figure 2A:
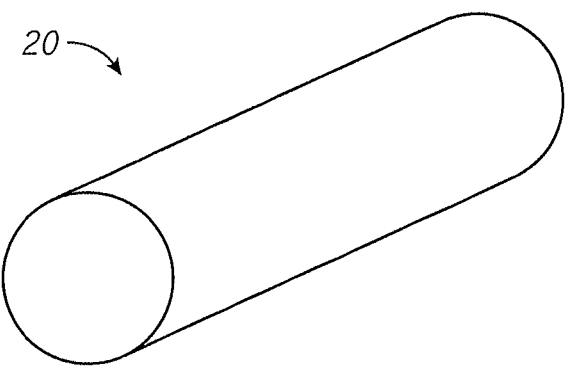
FIG. 2A is schematic illustration of an electrode wire comprising one or more alkaline earth metal elements, according to embodiments.

FIG. 2A is schematic illustration of a welding electrode wire 20, e.g., a metal cored welding electrode wire, comprising a base metal composition and one or more alkaline earth metal elements (Be, Mg, Ca, Sr, Ba, Ra), according to embodiments.

In various embodiments described herein including the illustrated embodiment of FIG. 2A, the base metal composition comprises a steel composition or an aluminum composition. In some embodiments, the base metal composition can be a carbon steel composition. To provide some non-limiting example compositions, a carbon steel composition includes Fe and one or more of C at a concentration between about 0.01 wt % and about 0.5 wt %, Si at a concentration between about 0.1 wt % and about 1.5 wt %, Mn at a concentration between about 0.5 wt % and about 5 wt %, S at a concentration between about 0.001 wt % and about 0.05 wt %, P at a concentration between about 0.001 wt % and about 0.05 wt %, Ti at a concentration between about 0.01 wt % and about 0.5 wt %, Zr at a concentration between about 0.01 wt % and about 0.5 wt %, Al at a concentration between about 0.01 wt % and about 0.5 wt % and Cu at a concentration between about 0.1 wt % and about 1 wt %.

In some other embodiments, the base metal composition can be a low-carbon steel composition. Some non-limiting examples include compositions having C at a concentration less than about 0.10 wt % and Mn at a concentration up to about 0.4 wt %, and compositions having C at a concentration less than about 0.30 wt % and Mn at a concentration up to about 1.5 wt %.

In some other embodiments, the base metal composition can be a low-alloy steel composition. To provide some non-limiting example compositions, a low-alloy steel composition includes Fe and one or more of C at a concentration between about 0.01 wt % and about 0.5 wt %, Si at a concentration between about 0.1 wt % and about 1.0 wt %, Mn at a concentration between about 0.5 wt % and about 5 wt %, S at a concentration between about 0.001 wt % and about 0.05 wt %, P at a concentration between about 0.001 wt % and about 0.05 wt %, Ni at a concentration between about 0.01 wt % and about 5 wt %, Cr at a concentration between about 0.1 wt % and about 0.5 wt %, Mo at a concentration between about 0.1 wt % and about 1 wt %, V at a concentration between about 0.001 wt % and about 0.1 wt %, Ti at a concentration between about 0.01 wt % and about 0.5 wt %, Zr at a concentration between about 0.01 wt % and about 0.5 wt %, Al at a concentration between about 0.01 wt % and about 0.5 wt % and Cu at a concentration between about 0.1 wt % and about 1 wt %.

In some other embodiments, the base metal composition can be a stainless steel composition. To provide some non-limiting example compositions, a stainless steel composition typically includes Fe and one or more of C at a concentration between about 0.01 wt % and about 1 wt %, Si at a concentration between about 0.1 wt % and about 5.0 wt %, Cr at a concentration between about 10 wt % and about 30 wt %, Ni at a concentration between about 0.1 wt % and about 40 wt %, Mn at a concentration between about 0.1 wt % and about 10 wt %, S at a concentration between about 0.001 wt % and about 0.05 wt % and P at a concentration between about 0.001 wt % and about 0.05 wt %.

Without being bound to any theory, each element discussed above can provide particular advantages in steel welding. Carbon can provide strength and ductility in the weldment. Manganese is another element that can add strength to the weld and can also serve as a deoxidizer which removes oxygen from the weld and reduces weld metal porosity. Silicon can serve as a deoxidizer, removing oxygen from the weld, and reduce the chance of weld metal porosity. In general, the higher the level of silicon in the metal, the more fluid the weld puddle. Additions of silicon can also increase tensile and yield strength. Phosphorus is generally undesirable to the weld deposit, as it can contribute to weld cracking. Sulfur is also generally undesirable for weldability and can contribute to weld cracking. However, in limited amounts, sulfur or phosphorus can improve fluidity and wetting of the weld puddle. Copper can be present as a result of coating of the wire electrodes (if copper-coated) for improved conductivity, and therefore, better arc initiation. Titanium can serve as a deoxidizer, in addition to silicon and manganese. Some deoxidizers aid in removing both oxygen and nitrogen from the weld, thereby reducing the occurrence of weld metal porosity. Zirconium, Aluminum, and Nickel can serve as deoxidizers. Molybdenum can add strength and improve impact properties, even when the weld is subject to stress relieving post-weld heat treatment. Chromium can improve corrosion resistance.

Base metal compositions other than steel compositions are possible. In some embodiments, the base metal composition can be an aluminum composition. To provide some non-limiting example compositions, an aluminum composition includes Al and one or more of Mn at a concentration between about 0.01 wt % and about 5%, Si at a concentration between about 0.1 wt % and 20 wt %, Fe at a concentration between about 0.1 wt % and about 1.0 wt %, Mg at a concentration between about 0.01 wt % and about 10 wt %, Cr at a concentration between about 0.01 wt % and about 1.0 wt %, Cu at a concentration between about 0.01 wt % and 10 wt %, Ti at a concentration between about 0.01 wt % and about 1.0 wt % and Zn at a concentration between about 0.01 wt % and about 1.0 wt %. These and other aluminum compositions can be included as part of the base metal of the welding electrode wire 20, according to embodiments.

In various embodiments described herein including the illustrated embodiment of FIG. 2A, the one or more alkaline earth metal elements (Be, Mg, Ca, Sr, Ba, Ra) are present at a concentration range between a minimum concentration of about 0.005%, 0.050% or 0.1%, and a maximum concentration of about 0.5%, 5% or 10%, on the basis of the total weight of the electrode wire.

When more than one alkaline earth metal elements are present, the above-indicated concentrations represent a combined concentration or an individual concentration.

In one particular embodiment, Ba is present at a concentration between about 0.05% and 5% or between about 0.1% and about 10%, for instance about 0.12%.

In another embodiment, Ca is present at a concentration between about 0.05% and 5% or between about 0.1% and about 10%, for instance about 0.12%.

In yet another embodiment, Ba and Ca are both present each at a concentration between about 0.05% and 5% or between about 0.1% and about 10%, for instance about 0.12%.

In some embodiments, the atoms of the alkaline earth metal are alloyed with the base metal composition. That is, the atoms of the alkaline earth metal form metallic bonds with atoms of the base metal composition. In some other embodiments, the atoms of alkaline earth metal are clustered, e.g., in the form of precipitates, within a matrix of the base metal composition. Yet other embodiments are possible, where the alkaline earth metal element is in the form of a compound, e.g., silicates, titanates, carbonates, halides, phosphates, sulfides, hydroxides, fluorides and oxides that form a mixture with the base metal composition.

Inventors have found that having the alkaline earth metal at concentrations described herein can provide, among other advantages, of providing stability to the arc at high current (e.g., exceeding 200 amps or exceeding 400 amps) for achieving high deposition rates (e.g., exceeding 30 lbs/hr). In addition, under some circumstances, the alkaline earth metal at concentrations described herein can advantageously serve as a deoxidizer.

According to embodiments, the above-described features can be achieved at least in part by configuring the weld metal electrodes 20 to have a diameter range of 0.045"-3/32" (1.1 mm-2.4 mm)

In the following, with respect to FIGS. 2B and 2C, without being bound to any theory, evolution of alkaline earth metal elements is described as a weld bead is formed, when welding electrode wires according to embodiments are used. It will be appreciated that the following description is applicable to welding electrode wires described above with respect to FIG. 2A, as well as embodiments described infra, with respect to FIGS. 3A-3B and 4. Furthermore, while the description applies to steel base metal compositions, analogous concepts apply to aluminum base metal compositions.

According to the equilibrium phase diagram (not shown) of the Fe—C system, several phases of iron exist, including the body-centered cubic ferrite (also known as $\alpha$-Fe), which is stable below about 910° C., the face-centered cubic austenite (also known as $\gamma$-Fe), which is stable above about 730° C., and delta-ferrite ($\delta$-Fe), which is stable above about 1,390° C. and up to the melting point at about 1,539° C. During welding, depending on the base steel composition, the liquefied electrode composition can be quenched via a number of pathways to form a solid weld bead. For example, for carbon steel and low-alloy steel compositions, the pathway can include L→$\delta$+L, followed by $\delta$+L→$\delta$+$\gamma$+L, followed by $\delta$+$\gamma$+L→$\gamma$+$\delta$+L→$\gamma$. Alternatively, the pathway for carbon steel and low-carbon steel compositions can include L→$\delta$+L, followed by $\delta$+L→$\delta$ for a peritectic composition. For a stainless steel composition, the pathway can be L→$\delta$+L, followed by $\delta$+L→$\delta$+$\gamma$. At concentrations of the alkaline earth metal described above, when the liquefied weld metal electrode, which includes dissolved alkaline earth metal elements, solidifies into a weld bead following one of the pathways described above, a relatively small amount of atoms of the alkaline earth metal element become incorporated into the lattice (e.g., a body-centered cubic lattice or a face-centered cubic lattice of the steel composition) of the steel composition substitutionally and/or interstitially. As a result, most of the alkaline earth metal atoms segregate or precipitate out to become incorporated into the resulting slag, according to embodiments. As a result, because most of the alkaline earth metal atoms do not substantially get incorporated into the resulting beads, the resulting weld beads are relatively free of the alkaline earth metal atoms.

Figure 2B:
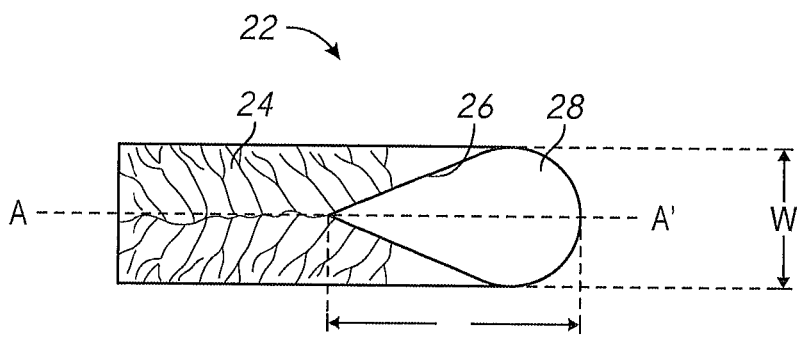
FIG. 2B is a schematic illustration of a weld bead formation using an electrode wire comprising one or more alkaline earth metal elements, according to embodiments.

FIG. 2B is a schematic illustration of a weld bead formation 22 using an electrode wire comprising one or more alkaline earth metal elements, according to embodiments. In FIG. 2B, weld metal crystals 24 of a weld bead have crystallized from a liquid phase of the electrode weld metal in a previous weld puddle, such as the weld puddle 28. The weld puddle 28 represents a liquid phase of the electrode weld metal as the weld bead continues to form in the x-direction. The weld bead formation 22 represents a bead formation under relatively high deposition rates, e.g., when the deposition rate exceeds ~30 lbs/hr. Under such circumstances, the shape of the weld puddle 28 can become elongated (e.g., length (l)/width (w)>1.5) in the direction along the weld centerline AA', in the form of a pear shape.

According to embodiments, when the concentration of alkaline earth metal elements is relatively high, e.g., higher than the solubility limit, as the weld puddle solidifies into one or more solid phases of the steel or aluminum compositions, impurity atoms may segregate to the liquid/solid interface 26 or to the surface of the bead as the weld bead grows, e.g., when the amount of alkaline earth metal atoms exceeds the amount that can be accommodated by the grains and the grain boundaries of the weld metal crystals 24. In addition, the weld pool 28 can continue to become enriched in concentration of the alkaline earth metal elements, eventually resulting in a slag which contains the segregated alkaline earth metal elements.

Figure 2C:
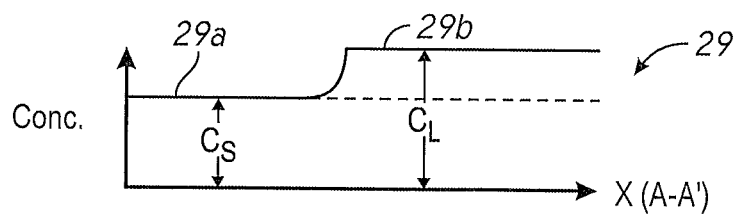
FIG. 2C is a schematic illustration of a concentration profile of the one or more alkaline earth metal elements along a weld centerline AA' of FIG. 2B.

FIG. 2C shows a graph 29 schematically illustrating a concentration profile of the one or more alkaline earth metal elements along a weld centerline AA' of FIG. 2B. According to some embodiments, the concentration of the alkaline earth metal element is selected such that a substantial amount, e.g., essentially all, of the alkaline earth metal atoms are segregated from the grains and/or grain boundaries of the weld metal crystals 24, which can include γ-Fe and/or δ-Fe grains, for embodiments in which the base metal composition is a steel composition, as illustrated in FIG. 2C. The graph 29 illustrates the concentration of alkaline earth metal in the weld centerline direction (x-direction) along a cross section of the weld centerline AA' of FIG. 2B. As illustrated in FIG. 2C, in some embodiments, the concentration 29a of a relatively small amount, e.g., a trace amount, of the alkaline earth metal which gets incorporated in the solid weld bead at or below the solubility limit, is relatively constant at $C_S$ along the x-direction. In addition, substantially all of the alkaline earth metal segregates at the liquid/solid interface 26 and/or to the surface such that the concentration 29b of the alkaline earth metal at $C_L$ in the weld puddle 28 substantially exceeds that of $C_S$. The weld puddle 28 can continue to become enriched in concentration of the alkaline earth metal elements, eventually resulting in a slag.

When the weld puddle, which becomes enriched with the ala is cooled to form a weld bead, virtually all of alkaline earth metal segregates to the surface of the weld bead, e.g., as part of a slag. In various embodiments, advantageously, greater than about 80%, greater than about 90% or greater than about 99% of the initial concentration of the alkaline earth metal in the electrode wire segregates to the surface of the bead and/or the liquid/solid interface, thereby forming a slag which can be easily removed.

Various technical features described above with respect to FIG. 2A-FIG. 2C are not limited to a particular type of electrode, e.g., among solid electrode wires (GMAW), metal-cored wires (GMAW-C), flux-cored arc welding processes (FCAW), shielded flux-cored arc welding (FCAW-G), self-shielded flux-cored arc welding (FCAW-S), shielded metal arc welding (SMAW) or submerged arc welding (SAW). In the following, particular embodiments of cored electrodes comprising alkaline earth metal elements are described in detail.

Generally, a cored electrode is a continuously fed tubular metal sheath with a core of particles or powders. The core may include fluxing elements, deoxidizing and denitriding agents, and alloying materials, as well as elements that increase toughness and strength, improve corrosion resistance, and stabilize the arc. As described above, a cored electrode can be categorized as one of the following: metal-cored electrodes (GMAW-C), self-shielded flux-cored electrodes (FCAW-S) and gas-shielded flux-cored electrodes (FCAW-G). In the embodiments described herein, it will be appreciated that particles in metal-cored electrodes that contain alkaline earth metal elements are generally metal and alloy particles, rather than compounds such as oxides or fluorides, producing only small islands of slag on the face of the weld. By contrast, flux-cored electrodes that produce an extensive slag cover during welding, which supports and shapes the bead, can have particles containing alkaline earth metal elements in the form of compounds such as oxides and fluorides. As described below, various embodiments disclosed herein can be optimized for any one of metal-cored electrodes, self-shielded flux-cored electrodes and gas-shielded flux-cored electrodes.

As described above, metal-cored electrodes are composite electrodes having a sheath formed of, e.g., a mild steel, with a core of particles having specifically selected iron and other metal powders and alloys. Additives such as stabilizers and arc enhancers can be added easily, providing a wider operating window for the welder. Metal-cored electrodes (GMAW-C) are gas-shielded types that are an alternative to solid alloy electrodes (GMAW).

Because of the flexibility in manufacturing, when a job calls for special electrodes, metal-cored electrodes can be more economical than solid electrodes. Because the manufacturing process involves blending metal powders instead of creating a special melt of steel, small quantities are easier to produce, and minimum order quantities are much lower. As a result, metal-cored electrodes can be produced with shorter turnaround times and at lower cost than special-ordered solid electrodes.

Figure 3A:
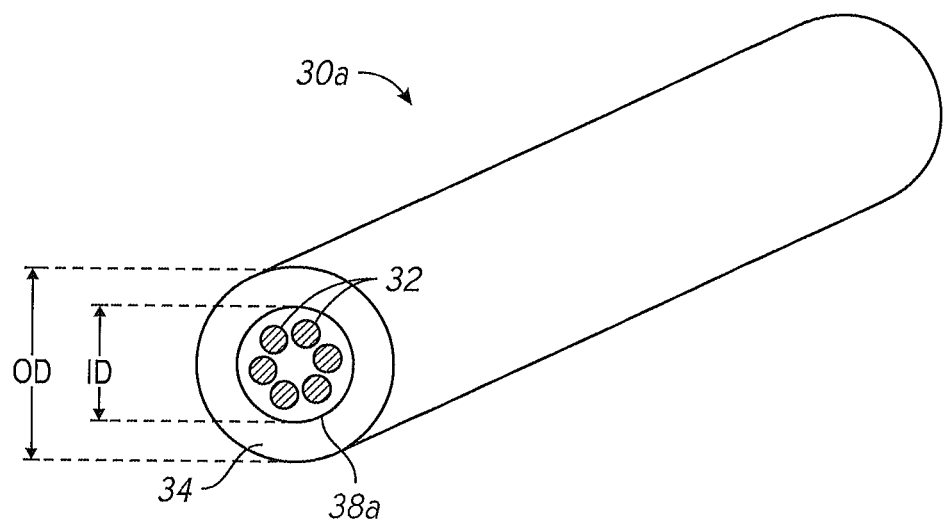
FIG. 3A is a schematic illustration of a metal-cored electrode wire having a core comprising one or more alkaline earth metal elements, according to embodiments.
Figure 3B:
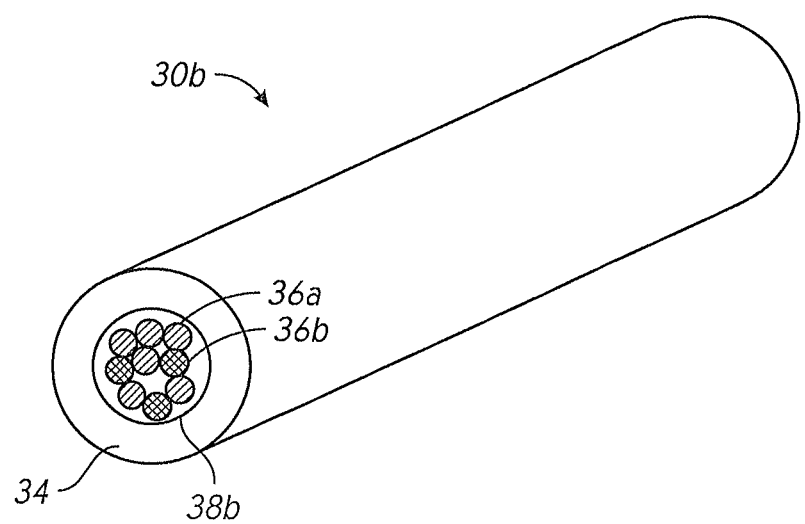
FIG. 3B is a schematic illustration of a metal-cored electrode wire having a core comprising one or more alkaline earth metal elements, according to embodiments.

FIGS. 3A and 3B are schematic illustrations of a metal-cored electrode wire 30a/30b having a core comprising one or more alkaline earth metal elements (Be, Mg, Ca, Sr, Ba, Ra), according to embodiments. Each of the metal-cored electrode wires 30a/30b includes a sheath 34 comprising a first base metal composition and a core 38a/38b surrounded by the sheath 34. The core 38a/38b is at least partially filled with particles comprising the one or more alkaline earth metal element(s) and a second base metal composition.

In the metal-cored electrode wires 30a/30b, the first base metal of the sheath 34 and the second base metal of the particles in the core can include any one of the steel or aluminum compositions described above with respect to the electrode 20 of FIG. 2A. In some embodiments, the first base metal and the second base metal are the same, while in other embodiments, the first base metal and the second base metal are different. In addition, the powder component includes an alkaline earth metal in various configurations, as described below.

Referring to the metal-cored electrode 30a of FIG. 3A, particles 32 are formed of an alloy of the second base metal composition and the alkaline earth metal, according to embodiments. Similar to the embodiment described above with respect to FIG. 1 above, in the illustrated embodiment of FIG. 3A, atoms of alkaline earth metal element can be dissolved, or directly incorporated, in the lattice (e.g., a body-centered cubic lattice or a face-centered cubic lattice of the steel composition) of the second base metal composition, e.g., substitutionally and/or interstitially. The atoms of alkaline earth metal element can also be clustered, e.g., form precipitates, within a matrix of the second base metal composition. Alternatively embodiments are possible, where the alkaline earth metal element is in the form of a compound, e.g., silicates, titanates, carbonates, halides, phosphates, sulfides, hydroxides, fluorides and oxides.

In the illustrated embodiment of FIG. 3A, particles 32 are substantially uniform in composition and contain similar or essentially the same amount of the alkaline earth metal. Such may be the case, e.g., when the particles 32 are produced from the same or different alloy ingot.

However, referring now to the metal-cored electrode 30b of FIG. 3B, other embodiments are possible. In the electrode 30b of FIG. 3B, particles 36a, 36b have different compositions. In some embodiments, particles 36a, 36b contain different elements. In other embodiments, particles 36a, 36b contain the same elements at different concentrations of one or more of the constituent impurities.

In some implementations, all particles 36a, 36b include a second base metal composition (e.g., steel or aluminum composition) and one or more alkaline earth metal elements, but at different concentrations of one or both of the second base metal composition and the one or more an alkaline earth metal elements. In some other implementations, some particles 36a include a second base metal composition while not including one or more alkaline earth metal elements, while other particles 36b include both a second base metal composition and one or more alkaline earth metal elements. In some other implementations, some particles 36a do not include a second base metal composition while including one or more alkaline earth metal elements, while other particles 36b include both a second base metal composition and one or more alkaline earth metal elements. In some other implementations, some particles 36a include a second base metal composition while including one or more alkaline earth metal, while other particles 36b do not include a second base metal composition while including one or more alkaline earth metal. In some other implementations, some particles 36a do not include a second base metal composition while including one or more alkaline earth metal elements, while other particles 36b include a second base metal composition while not including one or more alkaline earth metal elements. In some other implementations, no particles include a second base metal composition while all particles 36a, 36b include one or more alkaline earth metal elements at different concentrations.

In various embodiments described herein including the illustrated embodiment of FIGS. 3A-3B, the base metal composition comprises a steel composition or an aluminum composition having similar compositions as described above with respect to FIG. 2A.

In various embodiments described herein with respect to illustrated embodiments of FIGS. 3A-3B, one or more alkaline earth metal elements (Be, Mg, Ca, Sr, Ba, Ra) are present at concentrations described above with respect to FIG. 2A.

According to embodiments, the above-described concentrations can be achieved at least in part by configuring the metal-cored electrodes 30a/30b to have an outer diameter (OD) between 0.045" (1.1 mm) and 0.068" (1.7 mm), between 0.045" (1.1 mm) and ³⁄₃₂" (2.4 mm) or between 0.052" (1.4 mm) and 0.068" (1.7 mm).

According to embodiments, the above-described concentrations can be achieved at least in part by configuring the contents of the core 38a/38b and the sheath 34, such that the contents of the core constitute, on the basis of the total weight of the metal cored electrode wires 30a/30b, between about 1 wt % and about 80 wt %, between about 10 wt % and about 50 wt %, or between about 15 wt % and about 30 wt %.

Having the alkaline earth metal at particular concentrations and configurations described herein can have many advantages. Without subscribing to any theory, it is believed that the alkaline earth metal modifies certain plasma characteristics, e.g., increases the ionization potential. An increased ionization potential of the plasma in turn can lead to higher plasma stability at higher current, such that higher deposition rates, e.g., deposition rates exceeding 30 pounds per hour, can be sustained. In addition, as described elsewhere, because alkaline earth metal atoms do not substantially get incorporated into the resulting weld bead, degradation in mechanical properties of the resulting weldment can be prevented. Without subscribing to any theory, formation of new phases and/or excessive build-up of the alkaline earth metal in grain boundaries can be prevented.

According to some embodiments, described above with respect to metal-cored electrodes of FIGS. 3A-3B, the metal-cored electrodes (GMAW-C) are configured for gas metal arc welding, where the shielding is provided by a shielding gas. As described above, gas metal arc welding is distinguishable from flux-cored arc welding (FCAW), in which a flux contained within the tubular electrode produces the shielding. The fluxing agent forms a slag for flux-cored arc welding (FCAW). In FCAW, the material of the flux is not intended to be incorporated into the final weld bead. Instead, the flux forms a slag, which is removed after completion of welding. Thus, in various embodiments of metal-cored electrodes described herein, the cores do not contain additional fluxing agents.

It will be appreciated that metal-cored electrodes and flux-cored electrodes are further distinguishable based on the resulting bead characteristics. According to various embodiments, metal-cored electrodes descried herein produce slag islands on the face of the resulting weld bead. In contrast, flux-cored electrodes produce extensive slag coverage of the face of the resulting weld bead. For example, slag islands produced by metal-cored electrodes may cover less than 50%, 30% or 10% of the surface area of the weld bead. In contrast, slags produced by flux-cored electrodes may cover more than 50%, 70% or 90% of the surface area of the weld bead. While the amount and the arrangement of the alkaline earth metal in the electrodes may be more advantageous when present in the cores of metal-cored electrodes for high speed welding, embodiments are not so limited and the concepts described herein can be used in other electrode configurations, e.g., flux-cored electrodes.

Figure 4:
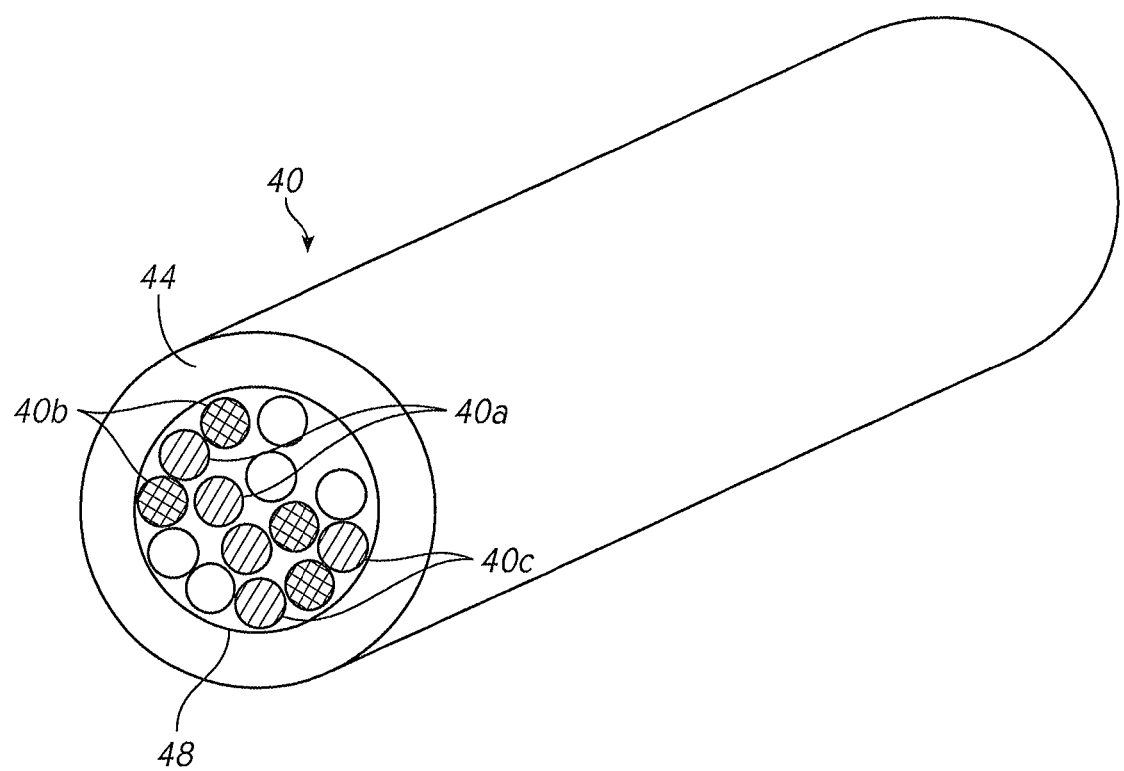
FIG. 4 is a schematic illustration of a metal-cored electrode wire having a core comprising one or more alkaline earth metal elements and fluorine-containing particles, according to embodiments.

FIG. 4 is a schematic illustration of a metal-cored electrode wire 40 having a core comprising one or more alkaline earth metal elements (Be, Mg, Ca, Sr, Ba, Ra), according to embodiments. The metal-cored electrode wire 40 includes a sheath 44 formed of a first base metal. The first base metal composition of the sheath 44 can include any one of the steel or aluminum compositions described above with respect to the electrode 20 of FIG. 2A. The metal-cored electrode 40 additionally includes a core 48 which includes particles 40a that include a second base metal composition and/or one or more alkaline earth metal elements according to any one or combination of configurations described above with respect to the particles 32 of FIG. 3A or particles 36a, 36b of FIG. 3B. The core 48 of the metal-cored electrode 40 additionally includes one or more fluorine-containing particles 40b, according to embodiments. In some other embodiments, the core 48 additionally includes one or more non fluorine containing particles 40c.

Without being bound to any theory, fluorine-containing compounds within fluorine-containing particles 40b are used to modify the properties of the slag to improve the shape of the bead, e.g., to reduce the tendency of gas tracking on the formed weld bead. For example, gas backing, which is a phenomenon observed wherein craters resembling worms are observed on the surface of the weld bead, may be reduced when the fluorine-containing compounds are present. Without being bound to any theory, gas tracking can be observed, e.g., in fast freezing slag systems (rutile based) where the slag solidifies much faster than the weld pool. Due to the rapid solidification of the slag, the gas evolving from the molten weld is partially trapped and thus forms craters on the weld bead surface.

Without being bound to any theory, fluorine containing compounds within the fluorine-containing particles 40b can also reduce the melting point of slag. The lower melting point of the slag allows the slag to remain molten for a longer time thereby allowing more time for gases to evolve from the molten weld and to dissolve in the slag. The inclusion of fluorine in the slag can also promote the formation of HF, thereby reducing hydrogen from the weld, which decreases the partial pressure of hydrogen in the weld system to reducing the incidence of gas tracking.

The fluorine-containing particles 40b can include a fluoro-polymer, according to some embodiments. When the fluorine-containing compound includes a fluoro-polymer, the fluoro-polymer can be a homopolymers of hydrocarbon monomers containing 2 to about 10 carbon atoms, where each monomer is substituted by at least one fluorine atom. For example, the fluoro-polymer, can be formed of polychlorotrifluoroethylene, polyvinylidene fluoride, polyvinyl fluoride, the fluorocarbon polymers such as polytetrafluoroethylene and polyhexafluoropropylene, and copolymers such as the copolymers of vinylidene fluoride and tetrafluoroethylene with hexafluoropropylene.

In embodiments, the fluoropolymer polymer has a melting point less than about 1,000° F. such that it may be incorporated into the core 48 in particulate form and retain its composition during forming and drawing of the electrode. It will be appreciated that it may be more impractical to employ the fluoro-polymers in a solid metal wire electrode as described above with respect to FIG. 2A because polymer may decompose during melting or alloying processes used for producing the solid wire.

In various embodiments disclosed herein, the concentration of fluorine (F) in the electrode wire is between about 0.02 wt % and about 2 wt %, between about 0.1 wt % and about 1.5 wt %, or between about 0.5 wt % and about 1.0 wt %, on the basis of the total weight of the electrode wire, for instance about 0.7 wt %.

Other embodiments are possible, wherein the fluorine-containing particles 40h include non-polymeric or inorganic fluorine-containing compounds, such as aluminum fluoride, barium fluoride, bismuth fluoride, calcium fluoride, manganese fluoride, potassium fluoride, sodium fluoride, strontium fluoride, polytetrafluoroethylene (such as Teflon®), $Na_2SiF_6$, $K_2SiF_6$, $Na_3AlF_6$ and/or $K_3AlF_6$; however, it will be appreciated that other or additional fluorine containing compounds can be used.

The non fluorine-containing particles 40c include a transition metal oxide, e.g., titanium oxide (e.g., rutile, etc.) and/or a transition metal containing compound (e.g. potassium silico-titanate, sodium silico-titanate, etc.), according to embodiments, Generally, the weight percent of the non fluorine-containing particles is greater than the weight percent of the fluorine containing compound, at a ratio between about 0.5-10:1, typically about 0.5-5:1, and more typically about 0.7-4:1, for example.

Figure 5:
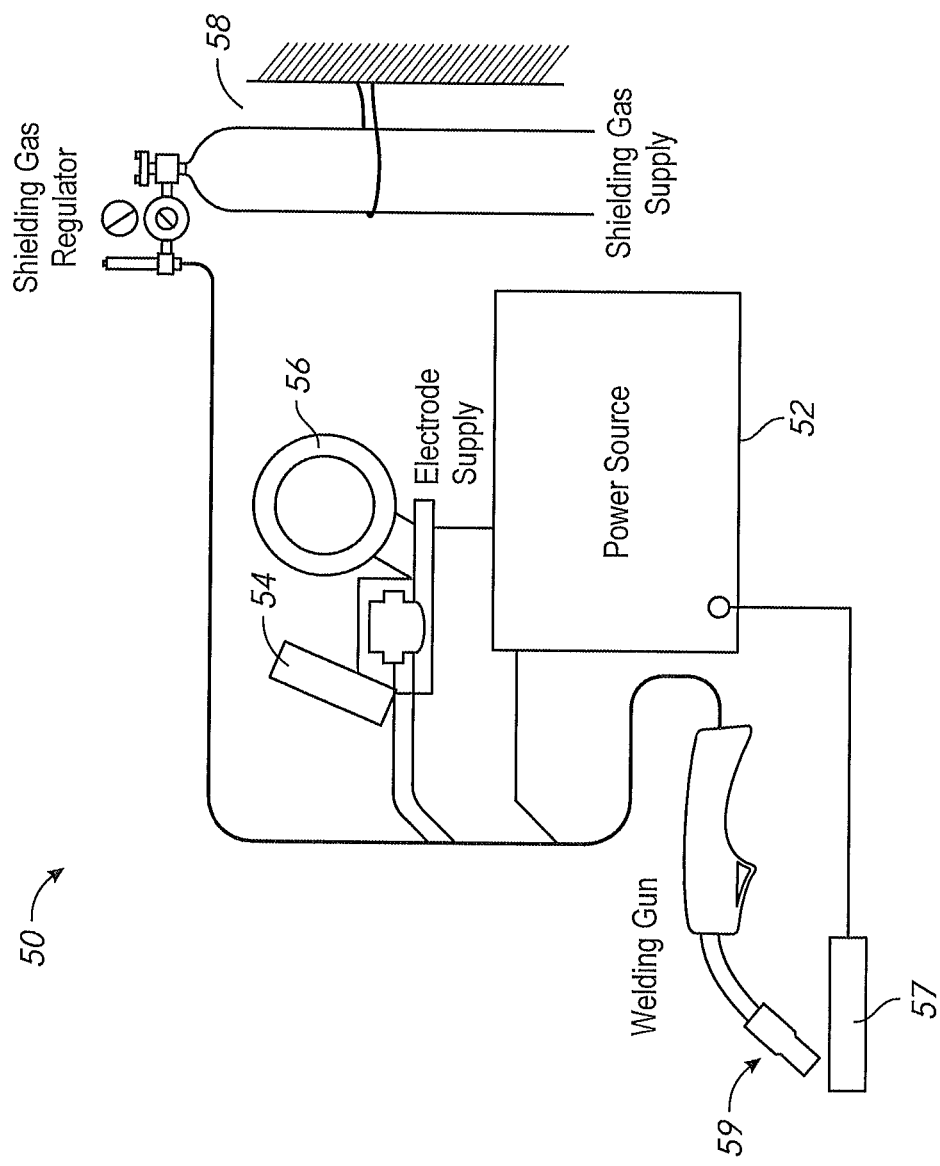
FIG. 5 is a schematic illustration of a metal arc welding system configured for high deposition rate using an electrode wire comprising one or more alkaline earth metal elements, according to embodiments.

FIG. 5 illustrates an arc welding system 50 configured for use with welding electrodes discussed supra to deposit weld metal at rates of ~30 lbs/hr or higher for open-arc welding, according to embodiments. In particular, the arc welding system 50 is configured for GMAW, FCAW, FCAW-G, GTAW, SAW, SMAW, or similar arc welding processes that can use a welding electrode comprising an alkaline earth metal, according to embodiments. The arc welding system 50 comprises a welding power source 52, a welding wire drive 54, a shielding gas supply 58, and a welding gun 59. The welding power source 52 is configured to supply power to the welding system 50 and is electrically coupled to the welding wire drive 54 such that the weld electrode wire serves as a first electrode, and is further electrically coupled to a workpiece 57 which serves as a second electrode, as depicted in detail FIG. 1. The welding wire drive is coupled to the welding gun 59 and is configured to supply welding electrode wire from the electrode supply 56 to the welding gun 59 during operation of the welding system 50. In some implementations, the welding power source 52 may also couple and directly supply power to the welding gun 59.

It will be appreciated that, for illustrative purposes, FIG. 5 shows a semi-automatic welding configuration in which an operator operates the welding torch. However, the metal-cored electrodes described herein can be advantageously used in a robotic welding cell, in which a robotic machine operates the welding torch.

The welding power source 52 includes power conversion circuitry that receives input power from an alternating current power source (e.g., an AC power grid, an engine/generator set, or a combination thereof), conditions the input power, and provides DC or AC output power to the welding system 50. The welding power source 52 may power the welding wire drive 54 that, in turn, powers the welding gun 59. The welding power source 52 may include circuit elements (e.g., transformers, rectifiers, switches, and so forth) configured to convert the AC input power to a DC positive or a DC negative output, DC variable polarity, pulsed DC, or a variable balance (e.g., balanced or unbalanced) AC output. It will be appreciated that the welding power source 52 is configured to provide output current between about 100 amps and about 1000 amps, or between about 400 amps and about 800 amps, such that weld metal deposition at rates exceeding about 30 lbs/hr can be achieved.

The shielding gas supply 58 is configured to supply a shielding gas or shielding gas mixtures from one or more shielding gas sources to the welding gun 59, according to embodiments. A shielding gas, as used herein, may refer to any gas or mixture of gases that may be provided to the arc and/or weld pool in order to provide a particular local atmosphere (e.g., to shield the arc, improve arc stability, limit the formation of metal oxides, improve wetting of the metal surfaces, alter the chemistry of the weld deposit, etc.). In certain embodiments, the shielding gas flow may be a shielding gas or shielding gas mixture (e.g., argon (Ar), helium (He), carbon dioxide ($CO_2$), oxygen ($O_2$), nitrogen ($N_2$), similar suitable shielding gases, or any mixtures thereof). For example, a shielding gas flow may include Ar, Ar/$CO_2$ mixtures, Ar/$CO_2$/$O_2$ mixtures, Ar/He mixtures, to name a few.

The wire drive 54 may include a permanent magnet motor for providing good control over starting, stopping and speed of wire feed. To enable high weld metal deposition rates exceeding about 30 lbs/hr, the wire drive 54 is configured to provide a wire feed speed between about 50 inches per minute (ipm) and about 2000 ipm, between about 400 ipm and about 1200 ipm, or between about 600 ipm and about 1200 ipm.

In operation, the welding gun 59 receives the welding electrode from the wire drive 54, power from the welding wire drive 54, and a shielding gas flow from the shielding gas supply 58 to perform arc welding on a workpiece 57. The welding gun 59 is be brought sufficiently close to the workpiece 57 such that an arc is be formed between the consumable welding electrode and the workpiece 57, as described supra with respect to FIG. 1. As discussed supra, by controlling the composition of the welding electrode, the chemistry of the arc and/or the resulting weld (e.g., composition and physical characteristics) may be varied.

Figure 6:
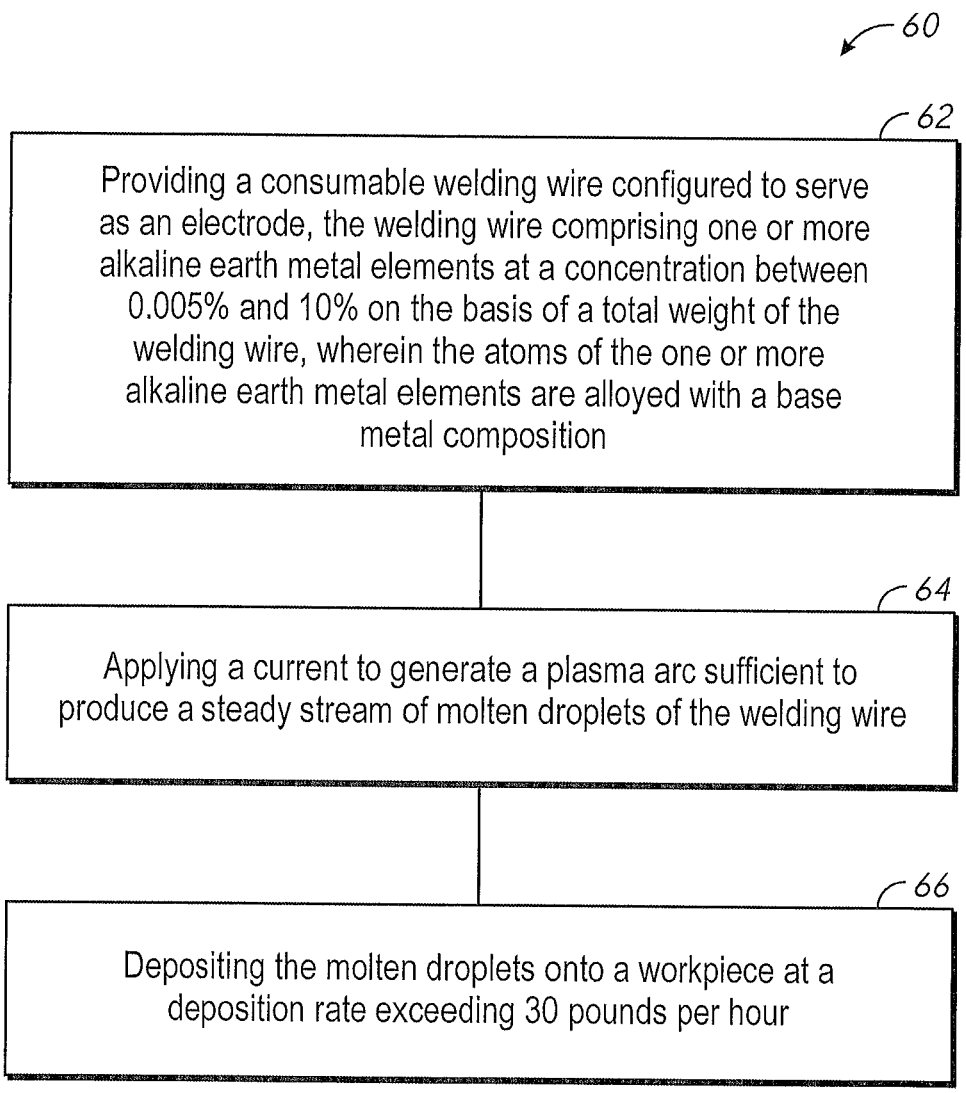
FIG. 6 is a flow chart of a method of metal arc welding using an electrode wire comprising one or more alkaline earth metal elements, according to embodiments.

Referring to FIG. 6, a method of metal arc welding 60 is described. The method 60 includes providing 62 a consumable welding wire configured to serve as an electrode, where the conductive wire comprises one or more alkaline earth metal elements at a concentration between 0.005% and 10% on the basis of a total weight of the metal-core wire. The atoms of the one or more alkaline earth metal elements are alloyed with a base metal composition. The method 60 additionally includes applying 64 a current to generate a plasma arc sufficient to produce a steady stream of molten droplets formed of the material of the welding wire. The method 60 further includes depositing 66 the molten droplets onto a workpiece at a deposition rate exceeding 25 pounds per hour.

In the method 60, providing 62 the consumable welding wire comprises providing any welding wire described above, e.g., with respect to FIGS. 2A, 3A, 3B and 4.

In the method 60, applying the current 64 includes applying an average current between about 300 amps and about 600 amps, between about 400 amps and about 700 amps, or between about 500 amps and about 800 amps to maintain an average number of plasma instability events are maintained below about 10 events per second, according to some embodiments. According to some other embodiments, applying the current 64 includes applying a peak current between about 400 amps and about 700 amps, between about 500 amps and about 800 amps, or between about 600 amps and about 900 amps.

In the method 60, depositing 66 includes depositing at a deposition rate exceeding about 20 lbs/hr, 30 lbs/hr, 40 lbs/hr or 50 lbs/hr, according to some embodiments. In some other embodiments, depositing 66 includes depositing at a deposition rate between about 20 lbs/hr and about 70 lbs/hr, between about 30 lbs/hr and about 80 lbs/hr, between about 40 lbs/hr and about 90 lbs/hr, or between about 50 lbs/hr and about 100 lbs/hr, according to embodiments. Such deposition rate can be achieved by applying the current levels described above in conjunction with wire feed speed between about 200 m/min and about 400 m/min, between about 300 m/min and about 500 m/min or between about 400 m/min and about 600 m/min, according to embodiments.

Figure 7:
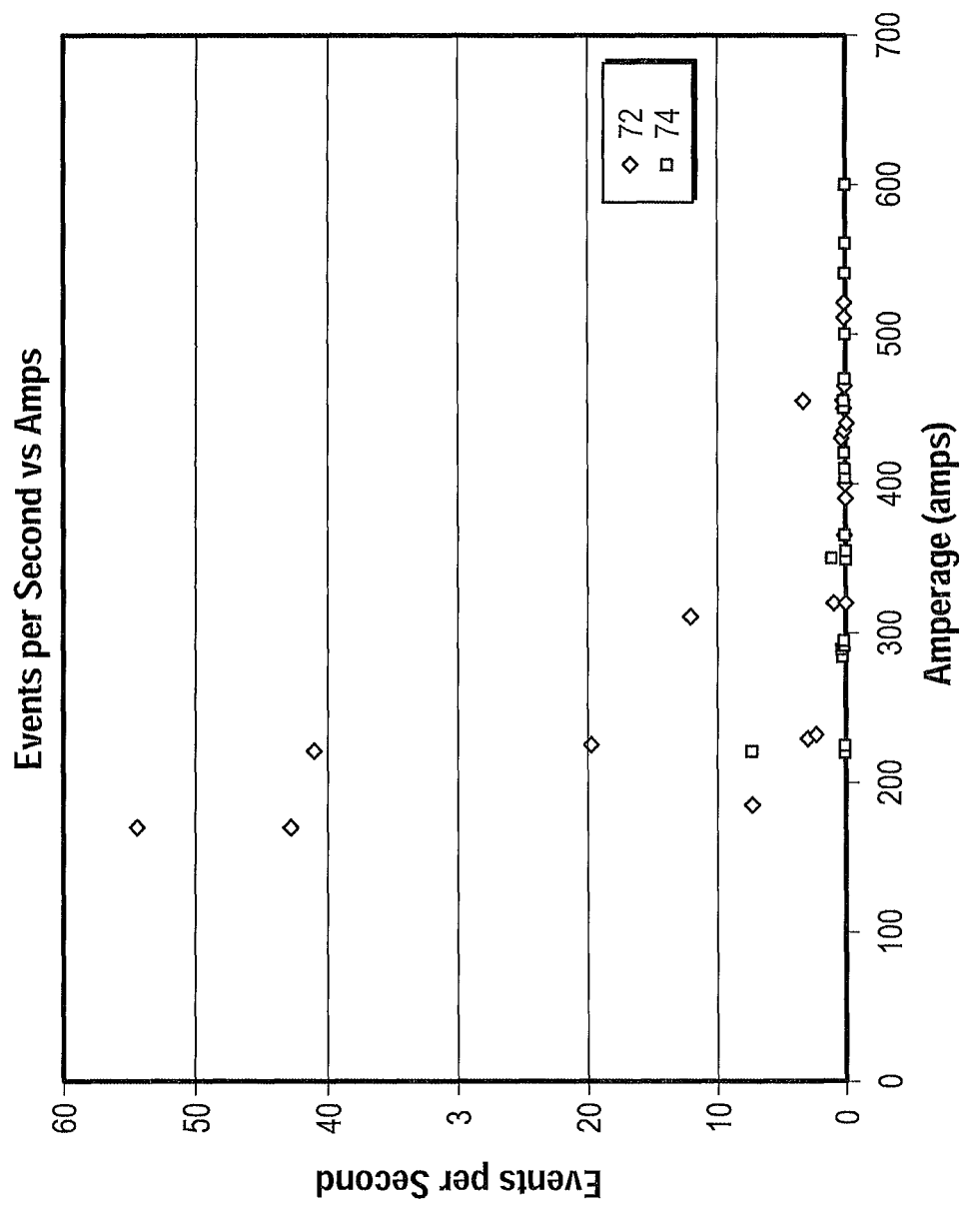
FIG. 7 is a graph illustrating experimental arc instability monitoring result of an electrode wire comprising one or more alkaline earth metal elements, according to embodiments.

FIG. 7 is a graph 70 illustrating experimental arc instability monitoring result of an electrode wire comprising one or more alkaline earth metal elements, according to embodiments. The y-axis represents number of instability events per second while the x-axis represents an average current passed through welding electrodes. As described herein, an arc instability event is defined as an event during a sustained deposition arc in which the deposition current, as measured between the consumable electrode and the workpiece, rapidly changes by more than about 3 standard deviations of the average value. In practice, such instability events negatively affect the weld bead's appearance and the mechanical properties, and welding is performed at current values in which such events occur as least frequently as possible.

Still referring to FIG. 7, the monitoring result 74 is that of an arc welding electrode according to an embodiment. In particular, the welding electrode used was a cored welding wire comprising alkaline earth metal elements and a base metal composition based on a steel composition. The welding electrode used to generate the monitoring result 74 was a 1.4 mm diameter electrode which contained 0.12 wt % Ca alloyed with the steel composition, 0.12 wt % Ba alloyed with the steel composition and 0.7% fluorine in the form of polytetrafluoroethylene, according to one embodiment. Comparatively, a welding electrode used to generate the monitoring result 72 was a 1.4 mm diameter which had a similar composition as the welding electrode used to generate monitoring result 74, except, the control electrode did not contain Ca, Ba nor fluorine in the form of polytetrafluoroethylene.

For both monitoring results 74 and 72, the welding electrodes were welded robotically using a constant voltage (CV) mode between about 24V and about 37V, using the same mild steel T-joint (horizontal fillet) and same set of welding parameters. For all individual welds, instantaneous welding voltage and current were recorded at 20 kHz frequency (20,000 samples per second). As described herein, an arc instability event (or voltage instability event) refers to an instantaneous drop in welding voltage (from the set-point voltage) to a value below about 10 Volts. Without being bound to any theory, such arc instability events may correspond to instances of deviations from what is commonly referred to as a "spray transfer" mode of metal transfer. As illustrated, in the monitoring result 72, the number of arc instability events reduces dramatically to less than about 20 at an average current of about 300 amps, and to about zero at an average current of about 500 amps. In contrast, in the monitoring result 74 of the control electrode, the number of arc instability events reduces dramatically to less than about 10 at an average current of about 200 amps, and to about zero at an average current of about 250 amps. That is, it will be appreciated that optimal operational regime for the electrodes having the alkaline earth metal elements according to embodiments is at higher deposition rates and higher current values, compared to control electrodes that do not have the alkaline earth metal elements. In particular, the optimal operational current values for achieving high deposition rates using electrodes according to embodiments is at least 100-200 Amps higher than those for using control electrodes that do not have the alkaline earth metal elements.

While certain embodiments have been described herein, these embodiments have been presented by way of example only, and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. Any suitable combination of the elements and acts of the various embodiments described above can be combined to provide further embodiments. The accompanying claims and their equivalents are intended to cover such forms or modifications as would fall within the scope and spirit of the disclosure.

What is claimed is:

1. A consumable metal-cored welding wire configured to serve as an electrode during metal arc welding, the welding wire comprising:
    a sheath having a first base metal composition, wherein the first base metal composition is a steel composition;
    a core surrounded by the sheath and comprising particles having a second base metal composition alloyed with Ba at a concentration greater than 0.1% and less than 10% on the basis of a total weight of the welding wire,
    wherein, when present, non-metallic atomic elements in the core are present at a concentration not exceeding 5% on the basis of the total weight of the welding wire, and
    wherein the core further comprises a fluoropolymer at a concentration between 0.5% and 2% on the basis of the total weight of the welding wire.

2. The welding wire of claim 1, wherein the concentration of Ba is less than 0.5% on the basis of the total weight of the welding wire.

3. The welding wire of claim 1, wherein the first base metal composition and the second based metal composition comprise different metal or metal alloy compositions.

4. The welding wire of claim 1, wherein the first base metal composition and the second based metal composition comprise the same metal or metal alloy compositions.

5. The welding wire of claim 1, wherein the metal-core welding wire is configured for gas metal arc welding (GMAW).

6. The welding wire of claim 5, wherein the core further comprises a transition metal oxide.

7. A consumable metal-cored welding wire configured to serve as an electrode during metal arc welding, the welding wire comprising:
    a sheath having a first base metal composition, wherein the first base metal composition is a steel composition;
    a core surrounded by the sheath and comprising particles having a second base metal composition alloyed with one or more alkaline earth metal elements at a concentration greater than 0.1% and less than 10% on the basis of a total weight of the welding wire, wherein, when present, non-metallic atomic elements in the core are present at a concentration not exceeding 5% on the basis of the total weight of the welding wire, and wherein the welding wire is configured for gas metal arc welding (GMAW), and wherein the core further comprises a fluoropolymer at a concentration between 0.5% and 2% on the basis of the total weight of the welding wire.

8. The welding wire of claim 7, wherein the one or more alkaline earth metal elements includes Ba at a concentration greater than 0.1% and less than 0.5%, and wherein the core further comprises a transition metal oxide.

* * * * *